United States Patent

[11] 3,593,840

| [72] | Inventor | Nathan E. Guyer |
| | | Stoneham, Mass. |
| [21] | Appl. No | 818,656 |
| [22] | Filed | Apr. 23, 1969 |
| [45] | Patented | July 20, 1971 |
| [73] | Assignee | American Biltrite Rubber Co., Inc. |
| | | Chelsea, Mass. |

[54] CONVEYOR BELT FOR HOT MATERIAL
5 Claims, 1 Drawing Fig.

[52] U.S. Cl. ............................................ 198/193, 161/231
[51] Int. Cl. ............................................ B65g 15/30, E06b 3/12
[50] Field of Search ............................................ 198/193; 74/232; 161/165, 227, 231, 255

[56] References Cited
UNITED STATES PATENTS
3,246,735  4/1966  Hacker ........................ 198/193
2,310,819  2/1943  Orden ........................... 198/193
2,633,227  3/1953  Hutchins ...................... 74/232
3,224,566  12/1965  Elliott .......................... 198/193
3,415,700  12/1968  Webster ....................... 198/193 X FOREIGN PATENTS
209,824  5/1956  Australia ....................... 198/193

Primary Examiner—Edward A. Sroka
Attorney—Kenway, Jenney & Hildreth

ABSTRACT: A belt for conveying hot material, comprising a laminated carcass of rubberized fabric and an enclosing cover consisting of thin layers of rubber interleaved and bonded together with fabric plies and thus presenting a plurality of contiguous interfaces all at different depths within the cover itself tending to distribute areas of blister separation where they have the effect of heat-insulating the carcass of the belting.

PATENTED JUL20 1971
3,593,840
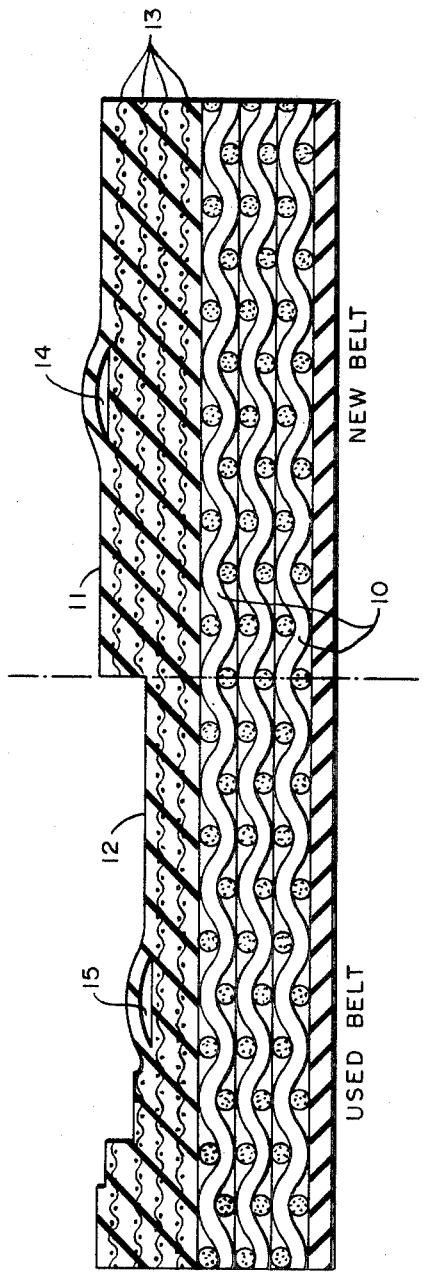
INVENTOR.
NATHAN E. GUYER

CONVEYOR BELT FOR HOT MATERIAL

This invention comprises a new and improved elastomeric conveyor belt especially constructed and arranged for long services in handling hot materials.

Heretofore conveyor belts for such service have been available for commercial operation at temperatures up to about 400° F. Beyond that temperature the life of the belt has been limited whenever abnormal conditions are encountered, such as hot spots from lumps of coke breaking open and exposing glowing centers, break down of cooling equipment, or power failure stopping the belt with hot material in place upon it. Such contingencies often cause a blister or a group of blisters to develop between the cover and carcass of the belt or between a fabric breaker sheet and the carcass or between the laminations of the carcass itself. Unless the blistered areas are cut out they will continue to enlarge due to flexing and pressure of trapped gas or elastomer fatigue. When an area of thick cover is removed for repair little or no protection is left for the carcass and it soon deteriorates from heat.

I have discovered that the objections above noted may be obviated and the separation characteristic of a laminated belt utilized to control the depth and location of blister separation by providing the belt with a cover laminated from thin alternate layers of woven fabric reinforcement and elastomer. This I have found will limit individual areas of blister separation to the interfaces located within the cover or between the cover and carcass. The areas of separation tend to be formed as gas pockets at interfaces at different depths within the cover itself and thus to insulate the carcass against destructive heat at the surface of the cover.

It will be understood that the trapped gases in the blister cavities tend to insulate the layers of the carcass beneath the blister by absorbing the heat of the expanding gases, separating the top or outer layers from the lower or inner layers, thus moving the hot source further from the body of the belt. Since the separation naturally occurs at interfaces and is limited only to succeeding exposed thin layers the chance is that no two blisters would occur at the same spot. Many hot spot blisters could therefore be assimilated at successive interfaces without penetrating deep enough to cause failure of the belt.

Conveyor belting of my invention has a further advantage in that it offers exceptionally effective impact resistance to cover gouging and stripping in handling either hot or cold material. Many impact gouged belts are removed after short service because gouges in the cover extend all the way through to the breaker interface so that a thick section of cover is torn off and the carcass exposed. It has been found that impact resistance to gouging has very materially increased in a conveyor belt having a multiply cover of alternate elastomer and open weave reinforcement fabric.

These and other features of the invention will be best understood and appreciated from the following description of a preferred embodiment thereof, selected for purposes of illustration and shown in the accompanying drawings in which the FIGURE is a view of a conveyor belt partly in elevation and partly in longitudinal section.

In the preferred embodiment of the invention the conveyor belt comprises a carcass of at least two plies of Dacron/Nylon fabric, rubber frictioned and with about 0.040 inches skim between plies. As herein shown the carcass contains three plies marked 10 with interposed skim coating 11. The carcass is enclosed in a cover ply 12 of heat-resistant elastomer such as SBR with a top gauge of about one-fourth inches and a bottom cover of about one-sixteenth inches gauge.

The essential feature of my invention resides in a top cover of alternating plies of heat-resistant rubbery elastomer and breaker fabric such as a loose woven Nylon leno fabric or cotton skim-coated on both sides with heat-resistant rubber built up to approximately a total gauge of 0.030 inches.

Starting with a rubber cover layer next to the carcass and then a layer of skim compound containing the leno breaker, alternating layers are added until the desired total top cover gauge of 0.250 inches is attained. Other top cover gauges would be made proportionately and similarly.

The best elastomer now known to me are -

Hot Service SBR Cover

| | |
|---|---|
| SBR-1500 | 100 |
| Naphthenic Oil | 9 |
| Stearic Acid | 2 |
| Zinc Oxide | 5 |
| *Antioxidant | 1 |
| FEF Black | 20 |
| EPC Black | 25 |
| Sulfur | 0.2 |
| Mercaptobenzothiazole disulfide | 1.0 |
| Tetramethylthiuram disulfide | 1.5 |
| Tetraethylthiuram disulfide | 1.5 |

*Polymerized 1, 2 dihydro-2, 2, 4 Trimethylquinoline

| | |
|---|---|
| Tensile | 2,000 lbs./inch$^2$ |
| Elongation | 650% |
| Shore A Durometer | 55 |

Hot Service SBR Skimcoat

| | |
|---|---|
| SBR-1500 | 100 |
| Stearic Acid | 2 |
| Zinc Oxide | 5 |
| FEF Black | 20 |
| MT Black | 20 |
| Naphthenic Process Oil | 12 |
| Sulfur | 0.25 |
| Mercaptobenzothiazole disulfide | 1 |
| Tetramethylthiuram disulfide | 1.5 |
| Tetraethylthiuram disulfide | 1.5 |
| *Antioxidant | 1.5 |

*Same as in Cover.

| | |
|---|---|
| Tensile | 1,600 lbs./inch$^2$ |
| Elongation | 800% |
| Shore A Durometer | 45 |

The leno breaker fabric would be:
  Nylon Leno—RFL treated and Tenter dried.
  Weave—Special leno weave, so woven as to have the filler over two and under two adjacent warps.
  Warp—Nylon  840/1  20/ends/inch
  Filling—Nylon  1680/1  10 picks/inch
  Weight (Avg.)  4.75 oz./sq. yd.
  Gauge (Avg.)  0.022 inches
  Elongation at break (Avg.)
    Warp  30 percent
    Filling  32 percent
  Tensile (Avg.)
    Warp  300 Lbs./inch
    Filling 10 275 Lbs./inch The leno breaker would be skimmed 0.010 inch—0.015 inch both sides with the above SBR skim coat resulting in a finished gauge of about 0.025 inch—0.030 inch in the cover layer.

Another example of a common hot material-handling conveyor belt would be four plies of a cotton/nylon fabric with 0.007 inch to 0.010 inch skims between plies with a 3/8 inch top cover and a 1/16 inch bottom cover of butyl hot materials compounds.

In this instance the top cover as specified in accordance with my invention would consist of a 0.051 inch cover compound layer next to the carcass, then a 0.030 inch layer of skim compound containing leno breaker fabric, continuing alternately until the full desired 0.375 inch gauge is attained. Other combinations of gauges of the alternating layers could be used, but generally the above appears to be the most desirable.

In the figure of the drawing the laminations have been shown in exaggerated thickness and it is suggested that bubble formations have been caused to form in the areas 14 and 15, that is to say, in the outer cover ply 11 at the interface of the exposed outer cover layer and the first breaker ply on the new belt, and in the exposed cover layer 12 at the interface of the third breaker ply in the example of used belt, or at different depths as determined by the wear and/or extent of previous blistering.

Having thus disclosed my invention and described in detail an illustrative embodiment thereof, I claim as new and desire to secure by Letters Patent -

I claim:

1. A belt for conveying hot material, comprising a laminated carcass of rubberized fabric, and a laminated cover on at least one side of the carcass, the cover comprising a plurality of alternating thin layers of two kinds, one kind of layer being a thin skimmed material comprising an open mesh fabric coated with a layer of first rubberlike material, and the other kind of layer being a solid layer of second rubberlike heat-resistant elastomer, the first material and the second elastomer having different tensile strengths.

2. The belt of claim 1, in which the open mesh fabric is a leno-type weave.

3. The belt of claim 1, in which said one kind of layer has a total thickness lying within the range 0.025 to 0.030 inch.

4. The belt of claim 1, in which the layer of second heat-resistant rubberlike elastomer is approximately 0.051 inch thick.

5. The belt of claim 1, in which the fabric is made of fibers of organic plastics.